United States Patent [19]
Newton et al.

[11] Patent Number: 6,035,250
[45] Date of Patent: Mar. 7, 2000

[54] LOCOMOTIVE BRAKE CONTROL UNIT WITH DYNAMIC BRAKE INTERLOCK

[75] Inventors: Ronald O. Newton, Adams; Kevin B. Root, Black River, both of N.Y.

[73] Assignee: New York Air Brake Corporation, Watertown, N.Y.

[21] Appl. No.: 08/927,637

[22] Filed: Sep. 11, 1997

Related U.S. Application Data

[60] Provisional application No. 60/026,039, Sep. 13, 1996.

[51] Int. Cl.[7] .............................. G06F 7/70; B60T 13/70
[52] U.S. Cl. ............................. 701/70; 701/19; 303/15; 303/16; 303/20; 303/7; 246/182 R; 246/182 B
[58] Field of Search .................... 701/70, 19, 20; 303/3, 7, 15, 20, 81, 27, 29, 86, 128, DIG. 4, 16, 37, 122.03, 122.07, 66, 75; 246/182 B, 169 R, 167 R, 187 R, 182 R

[56] References Cited

U.S. PATENT DOCUMENTS

| | | | |
|---|---|---|---|
| Re. 36,036 | 1/1999 | Engle | 303/3 |
| 4,052,110 | 10/1977 | Banker | 303/36 |
| 4,509,801 | 4/1985 | Newton et al. | 303/8 |
| 4,641,892 | 2/1987 | Schmid | 303/47 |
| 4,660,895 | 4/1987 | Chlumecky et al. | 303/75 |
| 5,286,096 | 2/1994 | Ferri et al. | 303/15 |
| 5,303,157 | 4/1994 | Root et al. | 701/20 |
| 5,358,315 | 10/1994 | Balukin | 303/15 |
| 5,385,392 | 1/1995 | Ferri | 303/20 |
| 5,412,572 | 5/1995 | Root et al. | 701/70 |
| 5,590,042 | 12/1996 | Allen, Jr. et al. | 701/70 |
| 5,722,736 | 3/1998 | Cook | 303/15 |
| 5,808,909 | 9/1998 | Rees | 702/114 |

*Primary Examiner*—Jacques H. Louis-Jacques
*Attorney, Agent, or Firm*—Barnes & Thornburg

[57] ABSTRACT

A locomotive brake control unit includes a manifold having a brake cylinder module for controlling pressure at the brake cylinder port in response to at least train braking signals and first and second ports on the control unit for receiving electropneumatic resetting and non-resetting dynamic brake interlocks respectively to control the train braking signals during dynamic braking, if an interlock module is present in one of the interlock ports.

18 Claims, 10 Drawing Sheets

FIG. 11

LOCOMOTIVE BRAKE CONTROL UNIT WITH DYNAMIC BRAKE INTERLOCK

CROSS-REFERENCE

This application claims the benefit of U.S. Provisional Application Ser. No. 60/026,039 filed Sep. 13, 1996 titled Locomotive Brake Control Unit with respect to common subject matter.

BACKGROUND AND SUMMARY OF THE INVENTION

The present invention relates generally to computer controlled railroad locomotive brake equipment and more specifically to a locomotive brake control unit with dynamic brake interlocks.

The availability of computer controlled railroad brake equipment includes the CCB equipment available from New York Air Brake Corporation. The CCB locomotive brake control equipment is described in U.S. Pat. No. 5,172,316. The numbers used throughout this application correspond to that used in this patent for sake of clarity and consistency.

With the addition of electropneumatic braking and other electric subsections, there has been a proliferation of new on board locomotive subsystems. Since the interconnection of these various subsystems have been added one by one, it has increased the complexity of their interconnection and their weight. The manifold is complex and wiring must be connected to each of the individual electrical valves and transducers. There are thirty-four line replaceable units mounted to the CCB manifold. To provide dynamic braking, the manifold would have to be modified to include a dynamic braking unit. The location of the modification will depend upon whether a resetting or non-resetting dynamic brake response was desired. Adaptor plates were used to incorporate the dynamic brake interlock valves to the manifold and the separate dead-in-tow valves.

Dynamic brake interlock is where the locomotive brakes application resulting from the automatic brake handle or train braking is disabled or released during dynamic braking. In a resetting dynamic brake interlock, the automatic brake application is reapplied once the dynamic braking is terminated. In a non-resetting dynamic brake interlock, the automatic brake application is released and is not reapplied after the termination of the dynamic brake. This protocol is defined by the end user and their preference for dynamic brake operation.

A typical example of prior art devices is the CCB I available from New York Air Brake Corporation. The main manifold includes a first dynamic interlock valve connected between the main reservoir and a pilot valve which provides one of the inputs to a double check valve whose output is the control signal for the brake cylinder relay. The pilot valve is piloted by the actuating pipe known as the 13-pipe. The other input to the double check valve is the automatic or train brake signal. A separate dead-in-tow triple valve not mounted on the manifold, provides a triple valve or back-up brake signal to the manifold for a brake cylinder control and is connected to the independent application and release pipe, or the 20-pipe, the brake pipe and the actuating pipe, or 13-pipe. The dead-in-tow triple valve structure includes a triple valve which controls an auxiliary reservoir as a function of the brake pipe. A pilot valve also controls the auxiliary reservoir in response to the actuating, or 13-pipe. The dead-in-tow triple valve also includes a double check valve which provides the higher value of the 16-pipe or brake signal pipe and the independent application release pipe, or 20-pipe as the triple valve or back-up brake signal to the 16 portion of the main manifold.

Depending upon whether a resetting or non-resetting dynamic brake interlock is required, a second dynamic brake interlock valve is provided in the dead-in-tow triple valve. For the resetting dynamic brake interlock, the magnetic valve disconnects the 16-pipe connection to the double check valve, which provide the triple valve output or back-up brake signal to the manifold. For the non-resetting in the dynamic brake interlock, an electromagnetic valve provides a 16-pipe signal as the control input for the bailoff pilot valve to the double check valve having its other input from the 13-pipe. This bailoff valve is connected to the auxiliary reservoir to bleed the auxiliary reservoir and a back-up brake signal reservoir connected to the dead-in-tow triple valve through operation of the triple valve. A brake signal or 16 reservoir is bled using the electropneumatic controls or the port of the back-up brake signal. For both types of dynamic brake interlock, the first dynamic valve was to disconnect the emergency operation of the brake during interlock.

Thus, there exists a need for a locomotive brake control system capable of being operated with setting or non-resetting dynamic brake interlocks and without dynamic brake interlocks without modification of the manifold.

A locomotive brake control unit, according to the present invention, includes a manifold having a brake cylinder module for controlling pressure at the brake cylinder port in response to at least train braking signals and first and second ports on the control unit for receiving electropneumatic resetting and non-resetting dynamic brake interlocks respectively to control the train braking signals during dynamic braking, if an interlock module is present in one of the interlock ports. The first port on the control unit for the resetting interlock prevents the brake cylinder from applying the brakes during dynamic braking in response to train braking signals and permits the brake cylinder module to reapply the brakes after dynamic braking in response to a train braking signal present before, during and after the dynamic braking. The second port on the control unit for a non-resetting dynamic brake interlock module prevents the brake cylinder from applying the brakes during dynamic braking in response to train braking signals and also prevents the brake cylinder module from reapplying the brakes after the dynamic braking in response to train braking signals present before, during and after the dynamic braking. The brake cylinder module controls pressure at the brake cylinder port during dynamic braking in response to train braking signals and absence of dynamic brake interlock modules in neither of the first or second ports.

The manifold includes an independent brake port and the brake cylinder module controls pressure at the brake cylinder port also in response to pressure at the independent brake port including during dynamic braking. The brake cylinder module includes the relay valve having a control input and a select valve for selecting the higher pressure of the train braking signals and the independent brake port pressure as a control port for the relay. The first or resetting dynamic interlock brake port is on the brake cylinder module between the train braking signal and the select valve.

The manifold also includes an actuating port and the brake cylinder module overrides the train braking signal to release the brakes in response to pressure at the actuating port. A control reservoir is connected to the manifold and the pressure of the control reservoir is the train braking signal. A bailoff valve responsive to a signal on its control input connects the control reservoir to exhaust. The second or non-resetting dynamic brake interlock port is connected to the supply port and a selector valve selects the higher value of the actuating port pressure and the pressure from the non-resetting dynamic brake interlock module in the second port as the control input to the bailoff valve.

The brake control unit also includes an electropneumatic brake signal module mounted on the manifold for providing the train braking signals to the brake cylinder module except when receiving a dynamic brake interlock signal. The first and second ports for the dynamic brake interlocks are on modules on the manifold versus the manifold itself. The control unit includes a pneumatic dead-in-tow module mounted on the manifold which provide a backup pneumatic train brake signal to the brake cylinder module. The second or non-resetting dynamic brake interlock is on the dead-in-tow module and connects the brake signal module and the actuating port.

The circuitry of the locomotive brake control unit has also been changed to allow incorporation of the dynamic brake interlock with a minimum number of parts. The unit includes the brake relay valve having an output connected to the brake cylinder port and having a control input, a first select valve has a pair of inputs connected respectively to the independent brake port and a train brake signal. The first select valve also has an output which is the greater of the inputs and is connected to the control input of the brake relay valve. A triple valve is connected to and responsive to the auxiliary reservoir and brake pipe ports to interconnect an auxiliary reservoir and the brake pipe ports and to provide a back-up brake signal. A bailoff valve selectively connects the backup brake signal or exhaust to its output in response to signals from the actuating port on its control input. A back-up brake signal reservoir port is connected to the output of the bailoff valve. An electropneumatic valve provides an EP brake signal. A second select valve having a pair of inputs receives the output of the bailoff valve and the EP brake signal and selects one of the inputs as an output which is the train brake signal connected to the first select valve. A train brake signal reservoir port is connected to the output of the second select valve.

A resetting electropneumatic dynamic brake interlock valve is connected between the train brake signal and the first select valve. During dynamic brake interlock, it disconnects the train brake signal from the first select valve and therefore only the independent brake signal controls the brake relay valve. For non-resetting a dynamic brake interlock, a third select valve is provided having a pair of inputs connected respectfully to the actuating port and a dynamic brake interlock signal and having an output which is the larger of the two inputs. This output is connected to the control input of the bailoff valve. A non-resetting electrodynamic brake interlock valve is connected and provides a dynamic brake interlock signal to the third select valve. During dynamic brake interlock, the non-resetting dynamic brake interlock valve operates the bailoff valve to disconnect the back-up brake signal from the downstream circuit and exhausts or empties the back-up brake signal reservoir. The output of the bailoff valve or control of the EP brake signal also empties or exhausts the train brake signal reservoir.

Other objects, advantages and novel features of the present invention will become apparent from the following detailed description of the invention when considered in conjunction with the accompanying drawings.

DETAILED DESCRIPTION OF THE DRAWINGS

Figure 1:
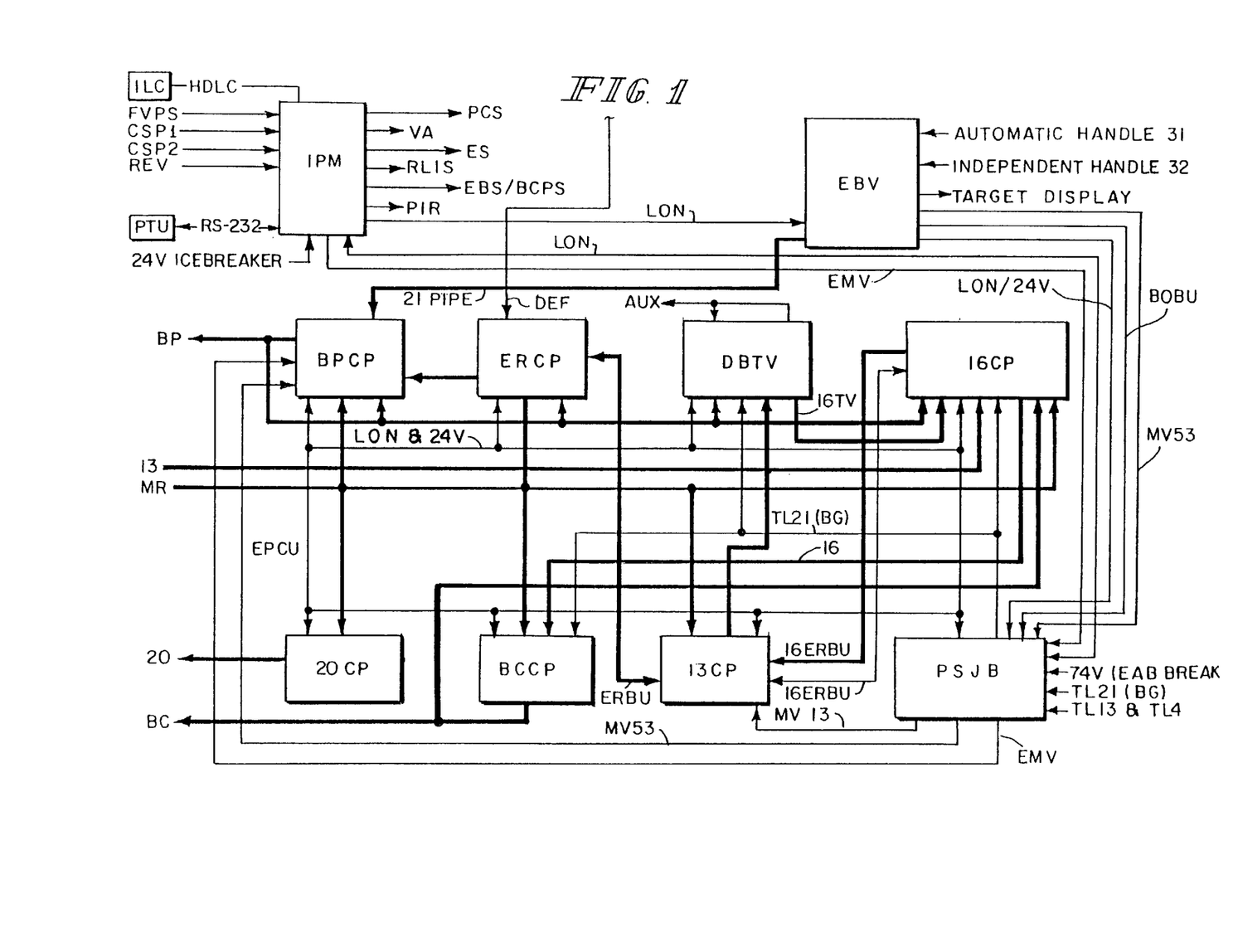
FIG. 1 is a block diagram of the locomotive brake control unit for use with the present invention.

An overview of the locomotive brake control unit for use with the present invention is illustrated in FIG. 1. The brake control unit includes an integrated processor module IPM, electronic brake valve EBV and an electropneumatic control unit EPCU. It should be noted that in the Figures the fluid lines of the pneumatic system will be illustrated by thick lines whereas the electrical interconnections will be illustrated by thin lines. Wherever possible, the elements in the Figures will have the same numbers as those of the prior art described in U.S. Pat. No. 5,172,316. All modifications will have a reference number in the 100s.

An integrated processor module IPM is the host computer for an electronic air brake system. The IPM manages the electrical interfaces between the brake system, the locomotive and the train. It communicates with integrated locomotive controls and interfaces electrical trainlines. The IPM can communicate with a portable testing unit for running system diagnostic tests and trouble shooting. It also has the ability to handle and/or include distributed power with the appropriate hardware and software upgrades. The IPM provides high level brake control logic, locomotive system integration communication or interfacing. The integrated processor module IPM is shown connected to an integrated locomotive computer ILC, and to a portable test unit PTU by an RS 232 connection. The other inputs to the IPM are from the propulsion and dynamic braking controller. It should be noted that a preferred distributor system is LOCOTROL Distributed Power Control available from GE-Harris.

The electronic brake valve EBV which serves as the input portion through the human-machine interface. The electronic brake valve EBV includes the automatic brake handle 31 and an independent brake handle 32 with a bailoff switch and provides output signals indicating the position of the handles and control signals as a function of the position of the handle. As a failsafe feature, the electric brake valve EBV operates a direct acting emergency venting of the brake pipe. The independent brake handle 32 provides electrical signals through to the control node of the EBV used for locomotive braking. The electronic bailoff signal from the independent handle portion 32 provides a first bail-off signal to the control node and a second bailoff signal as an output signal BOBU as a bailoff signal to the bailoff portion of the EPCU. The bailoff signal initiates release of an automatic or train braking on the locomotive. The automatic handle 31 provides train braking to the control node of the EBV and an automatic emergency signal MV53 to the EPCU to initiate the venting of brake pipe.

The electropneumatic control unit EPCU manages the pneumatic interface between the brake system, the locomotive and the train. It controls the locomotive brake cylinders, brake pipe, independent application and release pipe and the actuating pipe. The electropneumatic control unit EPCU includes the brake pipe control module BPCP, an equalization reservoir control portion ERCP, a dead-in-tow triple valve DBTV, a train brake signal or 16 pipe control portion 16CP, an independent or 20 pipe portion 20CP, a brake cylinder control portion BCCP, an actuating pipe or 13 pipe control portion 13CP and a power supply and junction box PSJB.

Each of the portions includes electronics and pneumatics which combined into an integral line replaceable units or modules. Each line replaceable unit reflects basic operational entity within the system and can be ready-track replaced. As can be seen from FIGS. 1 and 2, the electropneumatic control unit EPCU includes only seven replaceable units in addition to the power supply and junction box PSJB as compared to the thirty-four of the prior art. All of the required filters 67 are also directly mounted to the manifold 104. A single sized fastener 102 is used to connect each of the line replaceable units to the manifold 104.

The different portions of the locomotive control unit are interconnected by an Echelon LonWorks Network, although other networks may be used. This not only interconnects the modules of the EPCU, but also connects the EPCU to the IPM, EBV and an EP router.

Figure 2:
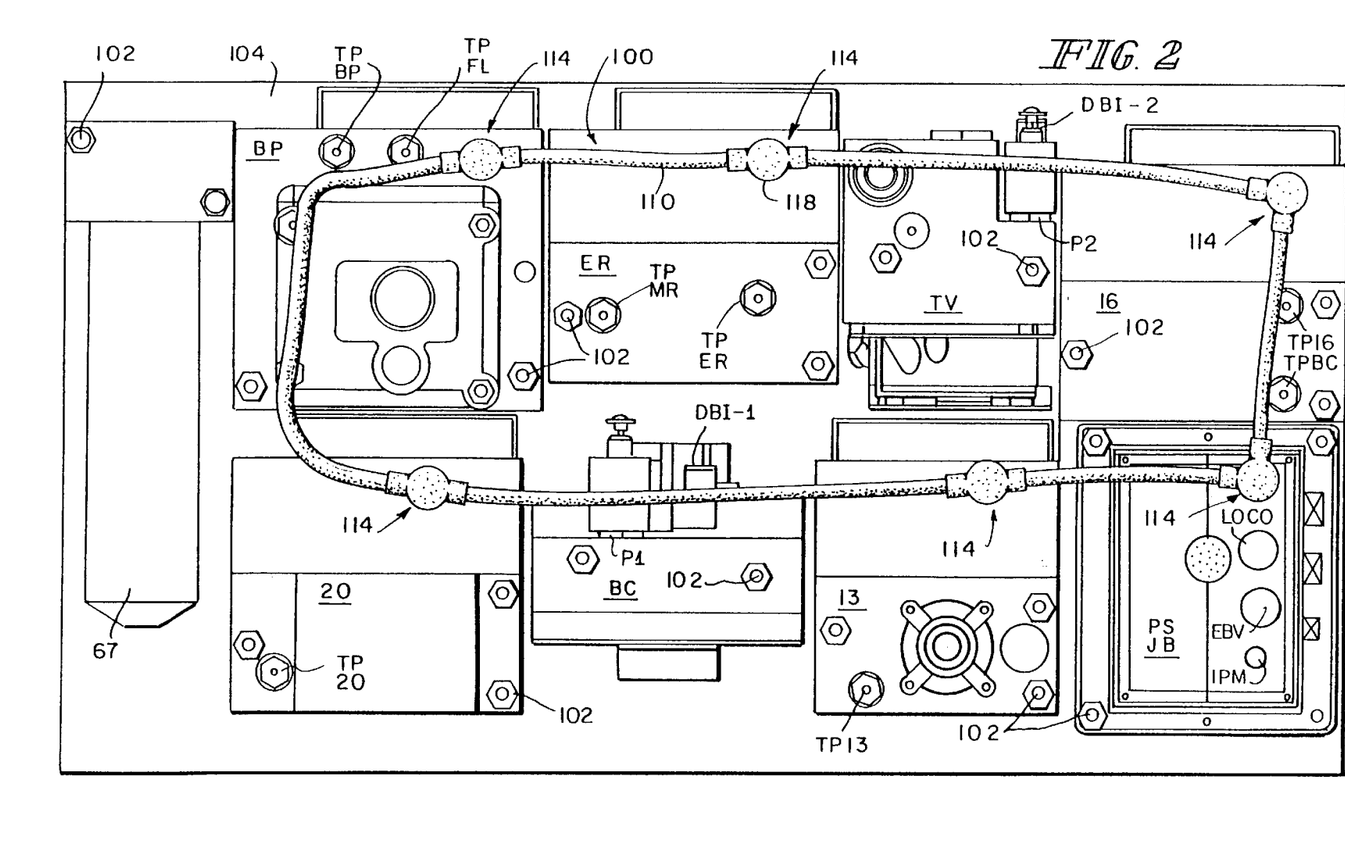
FIG. 2 is a plan view of the electropneumatic control unit incorporating the principles of the present invention.

The individual line replacement units or modules interconnected by a wire harness 100 are illustrated in FIG. 2. The wire harness 100 includes all of the electrical interconnection between the individual line replacement units or modules with each other and to outside control signals via the power supply and junction box PSJB. One of the signals received by PSJB is the dynamic brake begin signal BG on train line TL21. The wire harness 100 defines a path shown as a closed loop with a plurality of harness connectors 114 positioned along the path to mate with device connectors of the individual line replacement units or modules. All of the connections to all of the electrical or electropneumatic components, including electropneumatic valves, electrical sensors and other electronic elements within the modules are through the single device connector and its mating harness connector 114.

Besides the single portion connection or connector for all of the electrical wires using the wiring harness 100, each of the line replaceable modules include the appropriate test points TP physically on the module. Similarly, each of the modules include the required pressure transducers to be used by their local control node or microprocessor and connection as well as through the wiring harness.

The brake control unit as illustrated in FIGS. 1 and 2 include the capacity of operating with no dynamic brake interlock, with a resetting brake interlock or a non-resetting brake interlock. The seven line replaceable units are designed to provide this triple option without modification. Appropriate ports on the line replaceable units are capped or plugged for operating without dynamic brake interlock, or receive an appropriate dynamic interlock module in the ports to provide resetting or non-resetting dynamic brake interlocks. For sake of illustration only, a resetting dynamic brake interlock DBI-1, is shown mounted in a port P1 on the brake cylinder control portion BCCP in FIGS. 2 and 3. A non-resetting dynamic brake interlock DBI-2 is shown mounted to a port P2 on the dead-in-tow triple valve DBTV line replacing unit in FIGS. 2 and 4. Although both interlocks are shown on the EPCU, it is not required to provide both interlocks simultaneously in the electropneumatic control unit EPCU. Also, there is a danger that the wrong one will be connected electrically. Thus, it is preferred that only a single dynamic brake interlock module be applied at a time.

Figure 3:
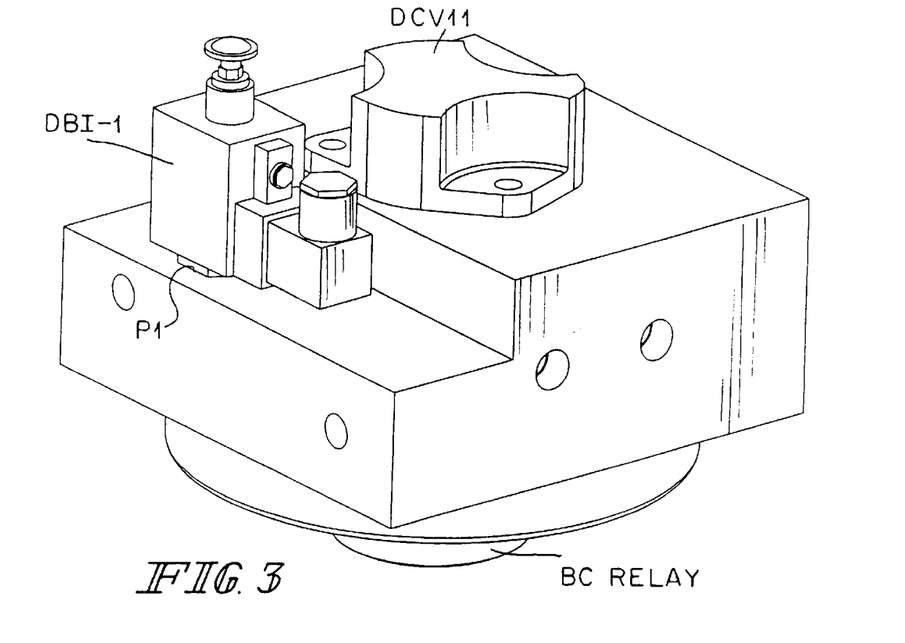
FIG. 3 is a perspective view of the brake cylinder control portion of FIG. 2.

The brake cylinder control portion module BCCP is illustrated in FIG. 3 as including a brake cylinder relay BC relay, a double check valve DCV11 and a dynamic brake interlock DBI-1, in port P1. If the dynamic brake interlock DBI-1 is removed, port P1 is plugged or capped.

Figure 4:
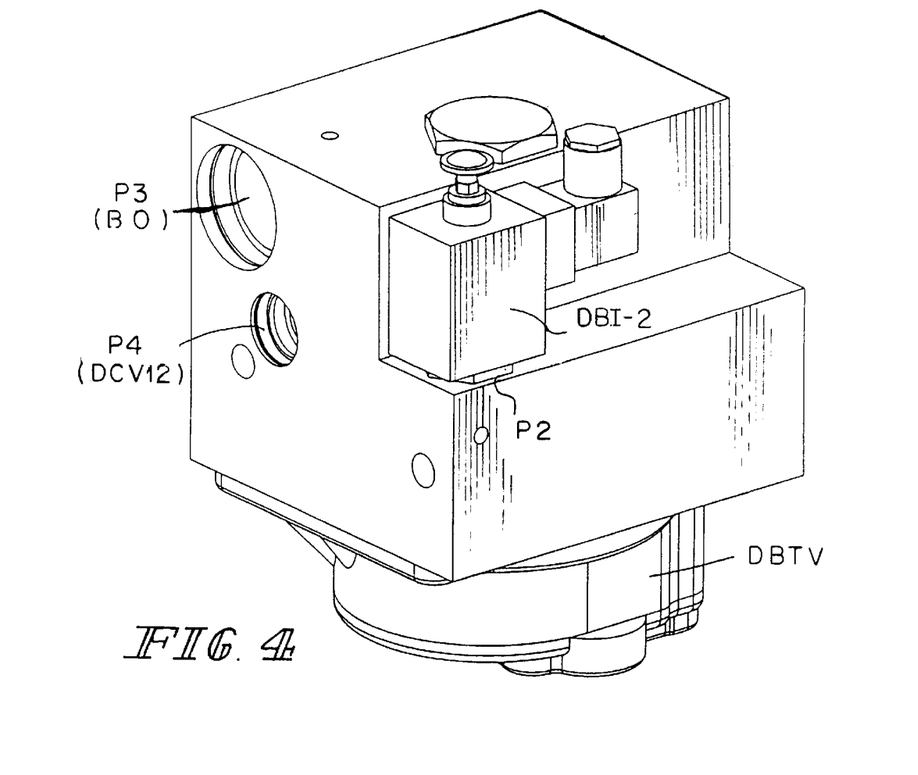
FIG. 4 is a perspective view of the triple valve control portion of FIG. 2.

The dead-in-tow triple valve DBTV control portion is illustrated in FIG. 4 as including the triple valve DBTV and a dynamic brake interlock DBI-2 mounted in port P2. A port P3 is shown to receive the bailoff valve BO and a port P4 shown to receive a double check valve DCV12. As will be explained below with respect to the diagrams of schematics of FIGS. 6–9, the double check valve DCV12 in port P4 is part of the dynamic brake interlock and port P4 is covered as is port P2 when the dynamic brake interlock DBI-2 and double check valve DCV12 are removed.

It should be noted that although the ports P1 and P2 for the dynamic brake interlocks and DBI-1 and DBI-2 are shown specifically on the brake cylinder control portion BCCP and the dead-in-tow control portion DBTV, they may have provided on other modules or line replacement units. The example shown was because the available space on these line replacement units selected and the availability of the appropriate pneumatic connection.

Figure 5:
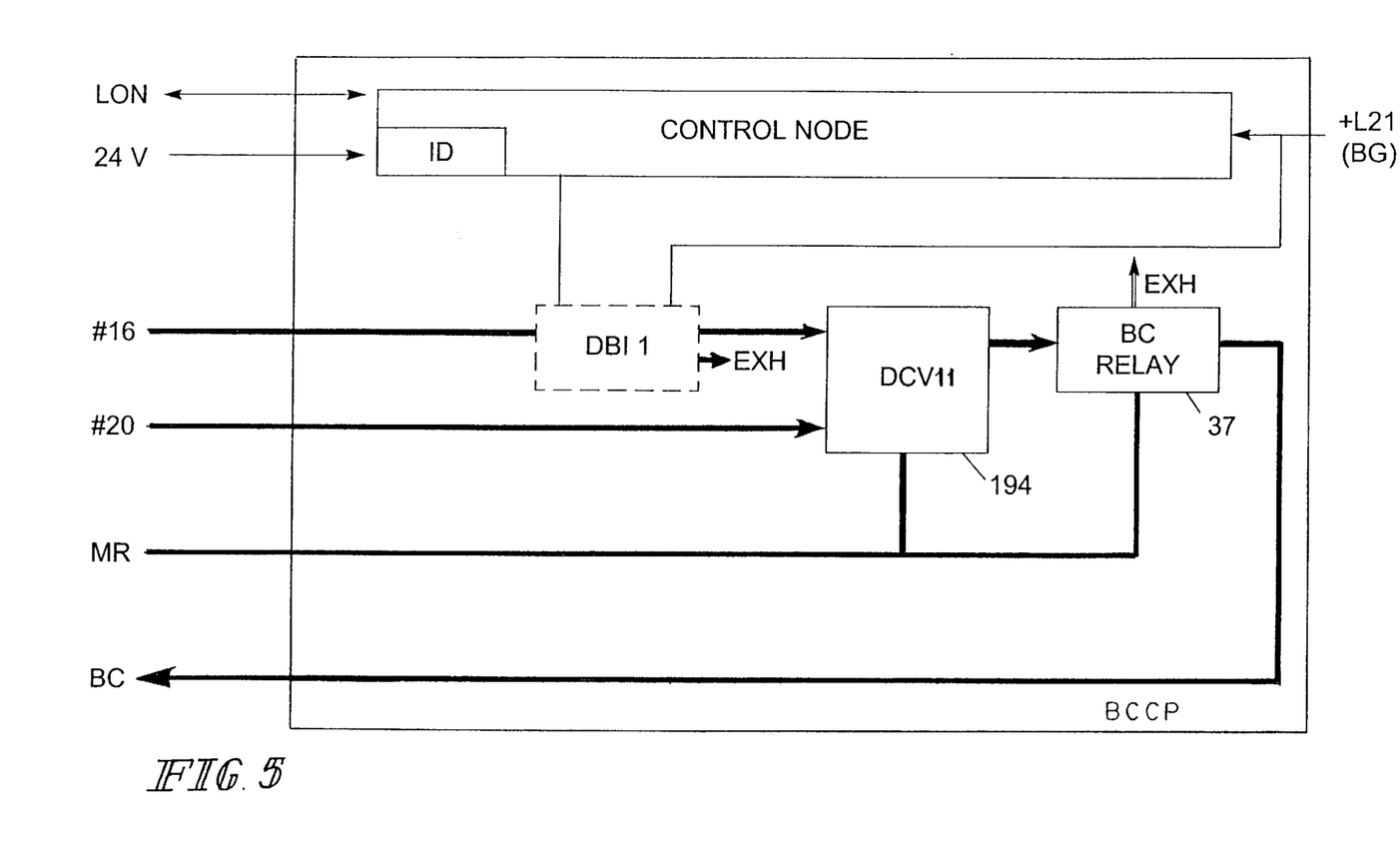
FIG. 5 is a block diagram of the brake cylinder control portion for a resetting dynamic brake according to the principles of the present invention.

The brake cylinder control portion BCCP, as illustrated in FIG. 5, includes a control node connected to the LON Network and receive a 24 volt power supply. The other input to the control node is the dynamic brake begin signal BG from trainline TL 21. Preferably, a control node is provided, but if the control node is not provided, then the TL21 wire is connected directly to the dynamic brake interlock DBI-1 illustrated in dash lines. A double check valve DCV11 provides the higher of either the 16 pipe or train brake signal or the 20-pipe or locomotive brake signal to control the brake cylinder relay 37 which controls the brake cylinder port BC using pressure from the main reservoir part MR.

The port P1 is provided on the brake cylinder control portion BCCP to receive a resetting dynamic brake interlock DBI-1 as illustrated in FIG. 3. If the dynamic brake interlock DBI1 is not provided in the port, the port is capped and there is a direct connection between the 16 pipe input and the double check valve DCV11. If a dynamic brake interlock DBI1 is provided, it is under the control of the control node in response to the dynamic brake begin signal TL 21, and will allow resetting of the pneumatic brake control after the dynamic braking is terminated.

Figure 6:
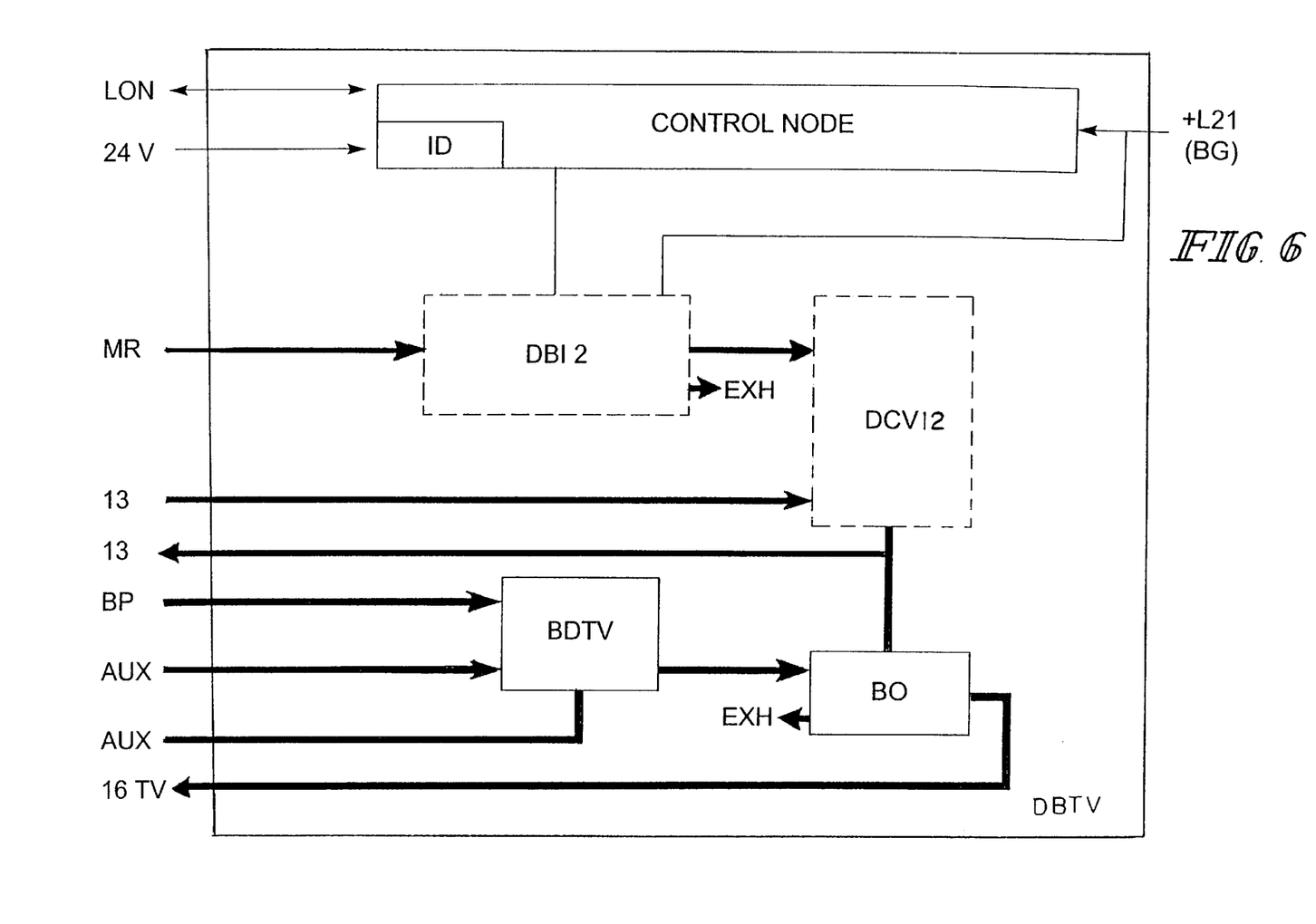
FIG. 6 is a block diagram of the triple valve control portion for a non-resetting dynamic brake according to the principles of the present invention.

The triple valve module of FIG. 6 includes a control node connected to the LON Network and receives a 24 volt power supply. As with the brake cylinder control portion, a dynamic brake signal TL 21 (BG) is provided to the control node to control a dynamic brake interlock DBI-2. If a control node is not provided, then the signal may be connected directly to the dynamic brake interlock. The dynamic brake interlock DBI-2, shown in phantom, is received in a port P2 in the control in the triple valve control module, as shown in FIG. 4, between the main reservoir MR and a double check valve DCV12 in port P4. The dynamic brake interlock DBI-2 is a non-resetting interlock. When the dynamic interlock DBI-2 is not present, the main reservoir MR is blocked and the 13 pipe is connected directly to the bailoff valve BO. As an alternative, the double check valve DCV12 may be part of the DBTV module even if the dynamic brake interlock DBI-2 is removed. The second input to the double check valve is the 13 pipe. Higher of the two signals is provided to the control input of a pneumatic bailoff valve BO as well being fed back to the 13 portion.

A triple valve DBTV is responsive to the difference in the brake pipe and an auxiliary reservoir pressure to charge an auxiliary reservoir AUX from the brake pipe BP and to provide an output signal to the bailoff valve B0. The output of the bailoff valve is provided as a pneumatic secondary or back-up train brake signal at output 16 TV to the 16 control portion.

Figure 7:
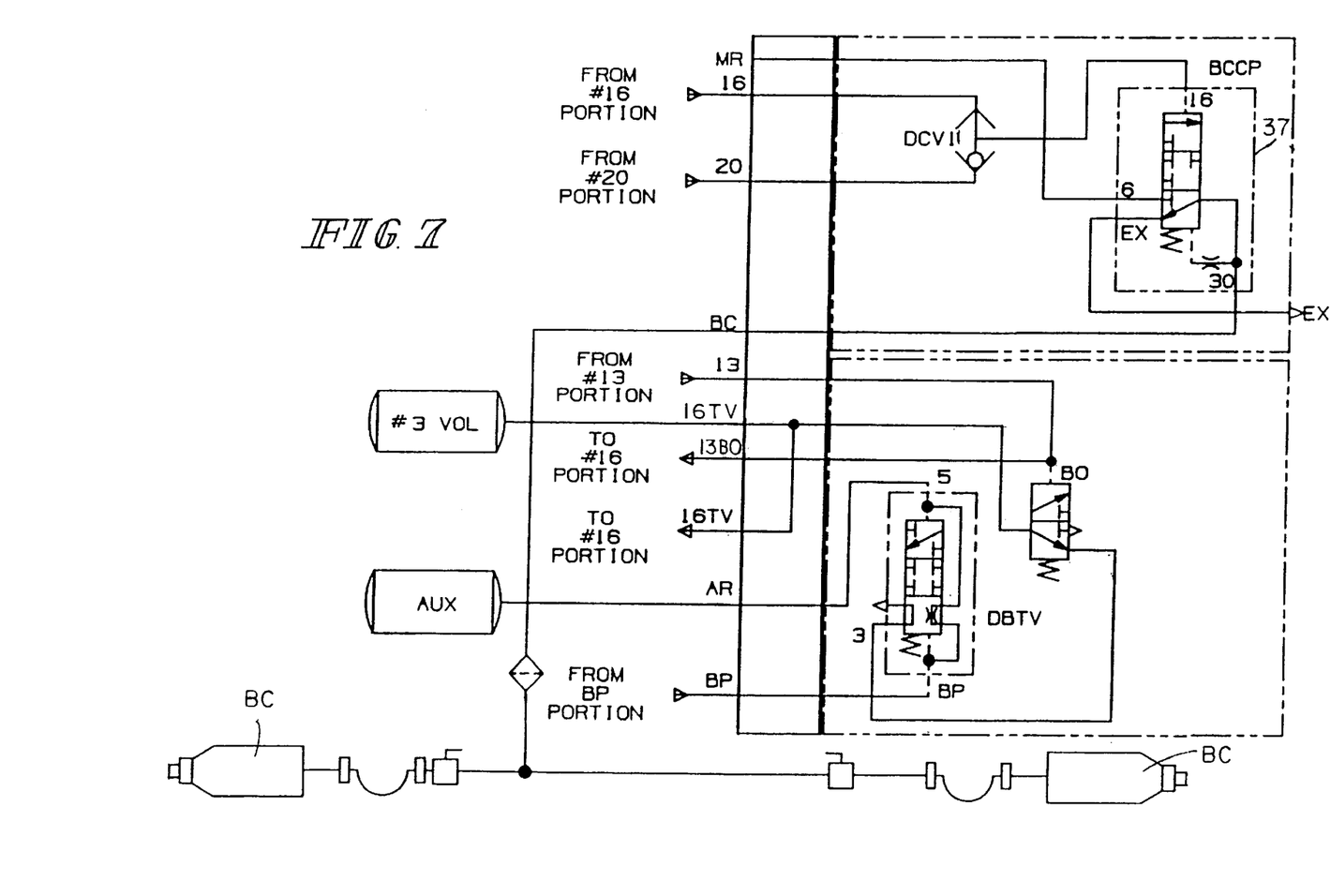
FIG. 7 is a schematic diagram of the brake cylinder and triple valve control portions with no dynamic brake interlock.

The detailed schematic of the brake cylinder control portion BCCP and the dead-in-tow portion DBTV without dynamic brake interlock is illustrated in FIG. 7. As previously discussed, the higher of the two signals from the 16 portion or the 20 portion is provided by the double check valve DCV11 as the control input to the brake cylinder relay 37 which controls the brake cylinder BC using pressure from the main reservoir MR. The dead-in-tow control portion DBTV includes a bailoff valve BO which is a pneumatic valve receiving a control signal from the 13 portion or actuating port to control the connection of the backup control signal 16TV as a train brake control signal from the dead-in-tow DBTV valve. The bailoff control signal is also provided to the 16 control portion via port 13/BO. The bailoff valve BO controls the pressure in reservoir #3 vol. or back up brake signal reservoir. The schematic as illustrated in FIG. 7 is shown with neither of the dynamic brake interlock modules or the second double check valve DCV2 inserted in either of these line replacement unit or modules.

Figure 8:
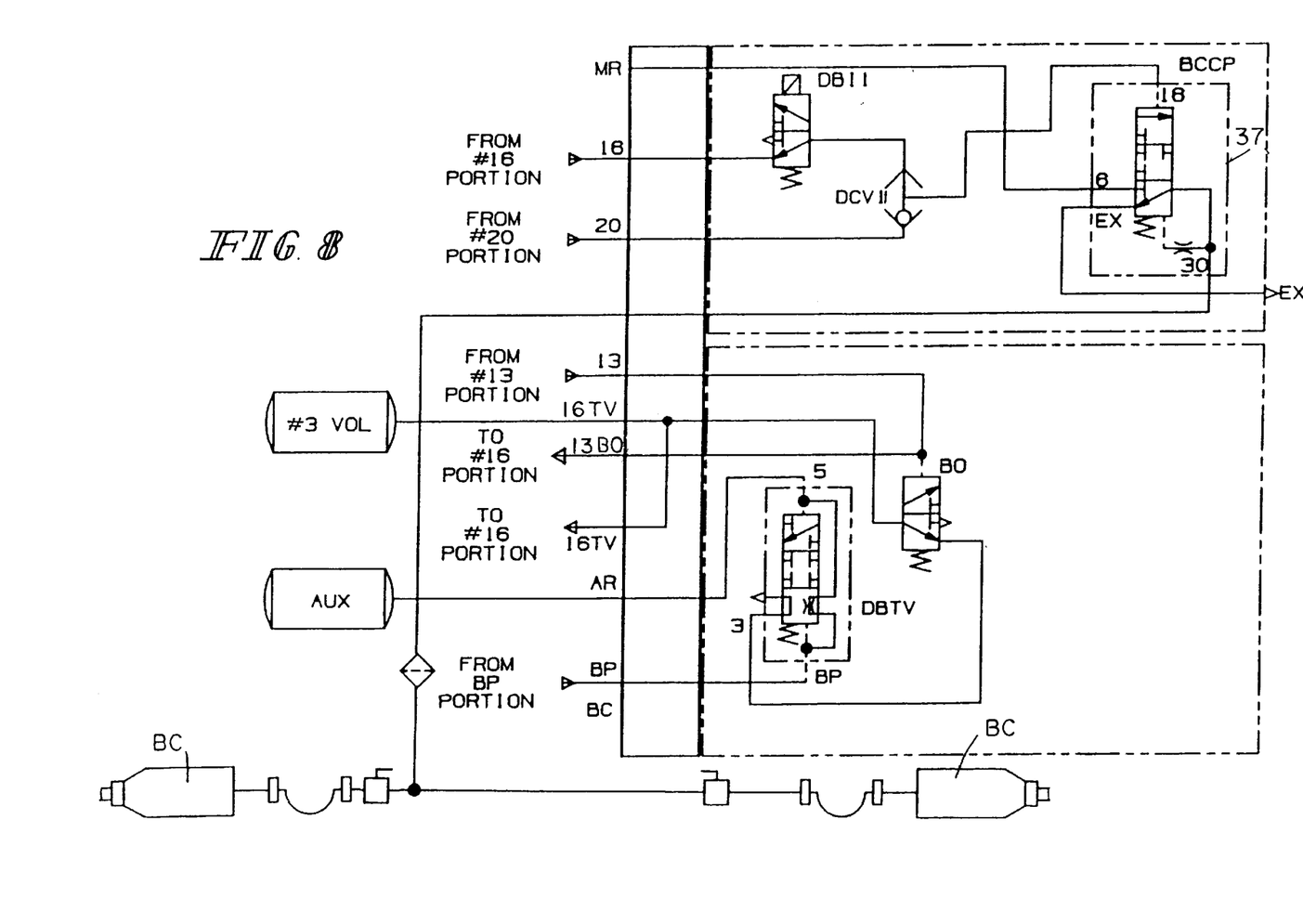
FIG. 8 is a schematic diagram of the brake cylinder and triple valve control portions with a resetting dynamic brake interlock.

To provide a resetting dynamic brake interlock, the dynamic brake interlock module DBI-1 is provided in the port P1 of the brake cylinder control portion BCCP as illustrated in the schematic FIG. 8. The port places it between the receipt of the train brake control signal from the 16 portion and the double check valve DCV11. In its unactuated position or when there is no dynamic braking, the dynamic brake interlock valve DBI-1 is in the position shown connecting the train brake signal from the 16 portion to the double check valve DCV1. The larger of the two signals is provided as a control signal to the brake cylinder relay 37.

Once dynamic braking begins, the dynamic brake interlock DBI-1 is activated, disconnecting the train control signal of the 16 portion from the double check valve DCV11. Thus, the only control signal to the brake cylinder relay is from the independent brake or 20 portion. Once the dynamic brake is terminated, the dynamic brake interlock DBI-1 will return to its position shown connecting the output from the 16 portion to the brake cylinder relay 37 via double check valve DCV11. Thus, if a train brake signal was produced by control portion 16 before the dynamic braking and is not released during or after the termination of the dynamic braking, the brake signal from control portion 16 is available to reapply the brakes. The train brake signal from the control portion 16 is maintained in a control or train brake signal reservoir 65 shown in FIG. 10.

If no independent brake signal is available from the control portion 20, the activation of the dynamic brake interlock DBI-1 will provide no signal to the brake cylinder relay 37 and the brakes will be fully released during dynamic braking. If a locomotive braking signal is available from the 20 or independent control portion, then this control signal will apply the value of the independent brake signal on the locomotive brake and not any train brake signal available from the 16 portion.

Figure 9:
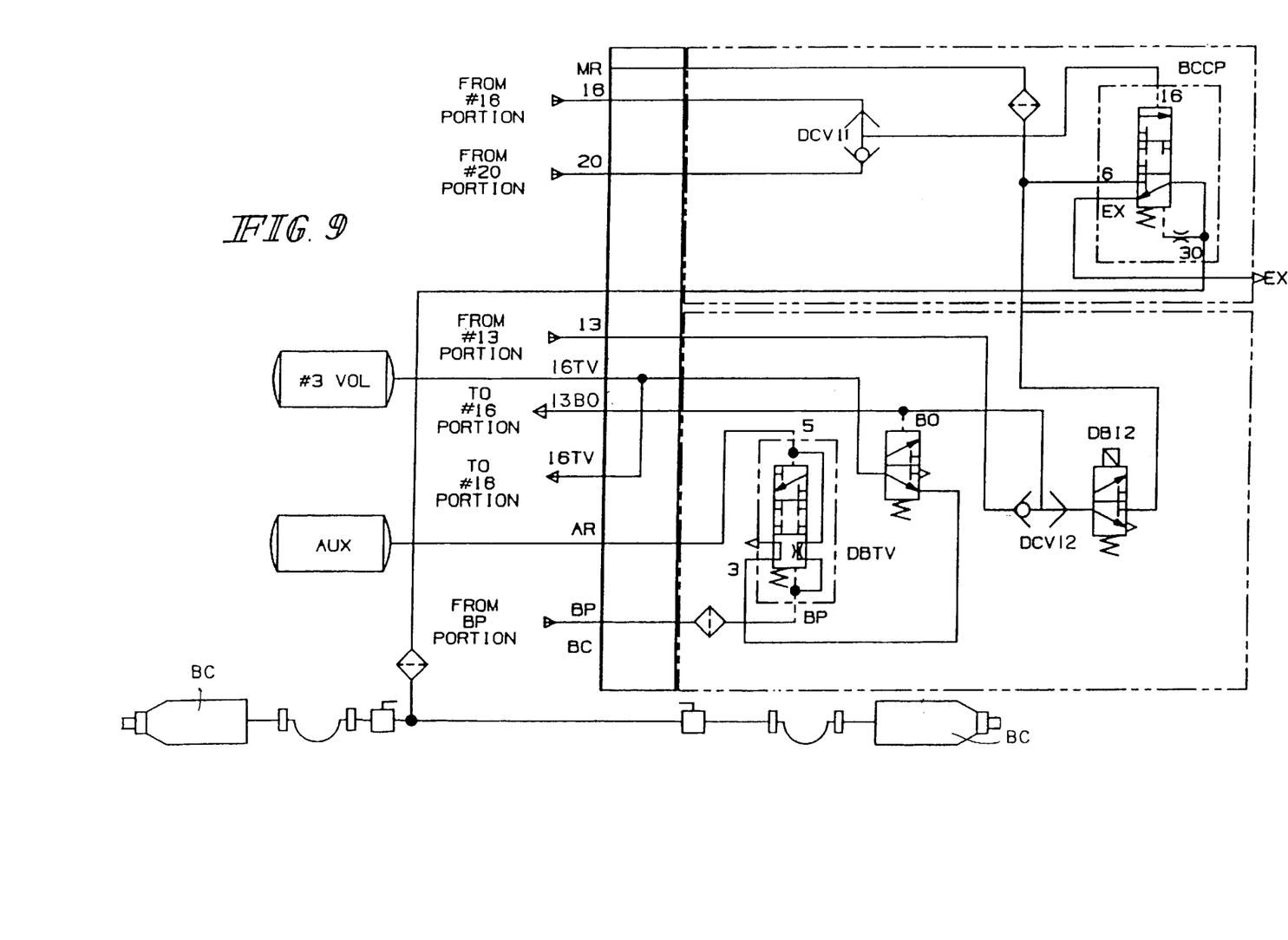
FIG. 9 is a schematic diagram of the brake cylinder and triple valve control portions with a non-resetting dynamic brake interlock.

A modification of the schematics of FIG. 7 showing the insertion of the non-resetting dynamic brake interlock DBI-2 and the double check valve DCV12 is illustrated in FIG. 9. The dynamic brake valve DBI-2 is shown in its non-dynamic braking condition connecting one input to the double check valve DCV-12 to exhaust. Thus, the output of double check valve DCV12, which is the control input to the bailoff valve BO, is from the actuating or 13 control portion. Upon receipt of the electrical dynamic braking signal, the dynamic brake interlock DBI-2 is actuated connecting the double check valve DCV12 to the main reservoir. This is the predominant signal which is provided as the control signal to the bailoff valve BO. This disconnects the triple valve DBTV from the 16TV or backup train braking signal for the 16 portion and connects the 16TV port and reservoir #3 vol. to exhaust.

Thus, any back-up braking signal provided by the DBTV valve and maintained by the #3 vol. is removed. As will be seen in the discussion of the 16 control portion of FIG. 10, the removing of the 16TV signal will also drain the control reservoir 65 of the output of the 16 control portion and thus, remove any braking signal that existed before or during dynamic braking.

When dynamic braking is terminated, and the bailoff valve BO returns to its shown position, there is no brake signal on the 16TV port to the 16 portion or on port 16 from the 16 portion. Thus, the train brake signal which was applied before or during the dynamic braking will not reactuate the locomotive brake cylinder using the 16 control portion. Thus, the dynamic brake interlock DBI-2 prevents the brake cylinder module BCCP from reapplying the brakes after dynamic braking.

As previously discussed, although the ports for the dynamic brake interlocks are provided on the brake cylinder control portion BCCP and the brake-in-tow portion DBTV, they may be provided at other places on other modules. For example, they may both be provided directly on the 16 control portion module 16CP. In the present design, the 16 control portion did not have available real estate for this porting.

To further understand the operation of the non-resetting dynamic brake interlock, a brief description of the 16 control portion 16CP and the actuating or 13 control portion 13CP will be described with respect to FIGS. 10 and 11.

Figure 10:
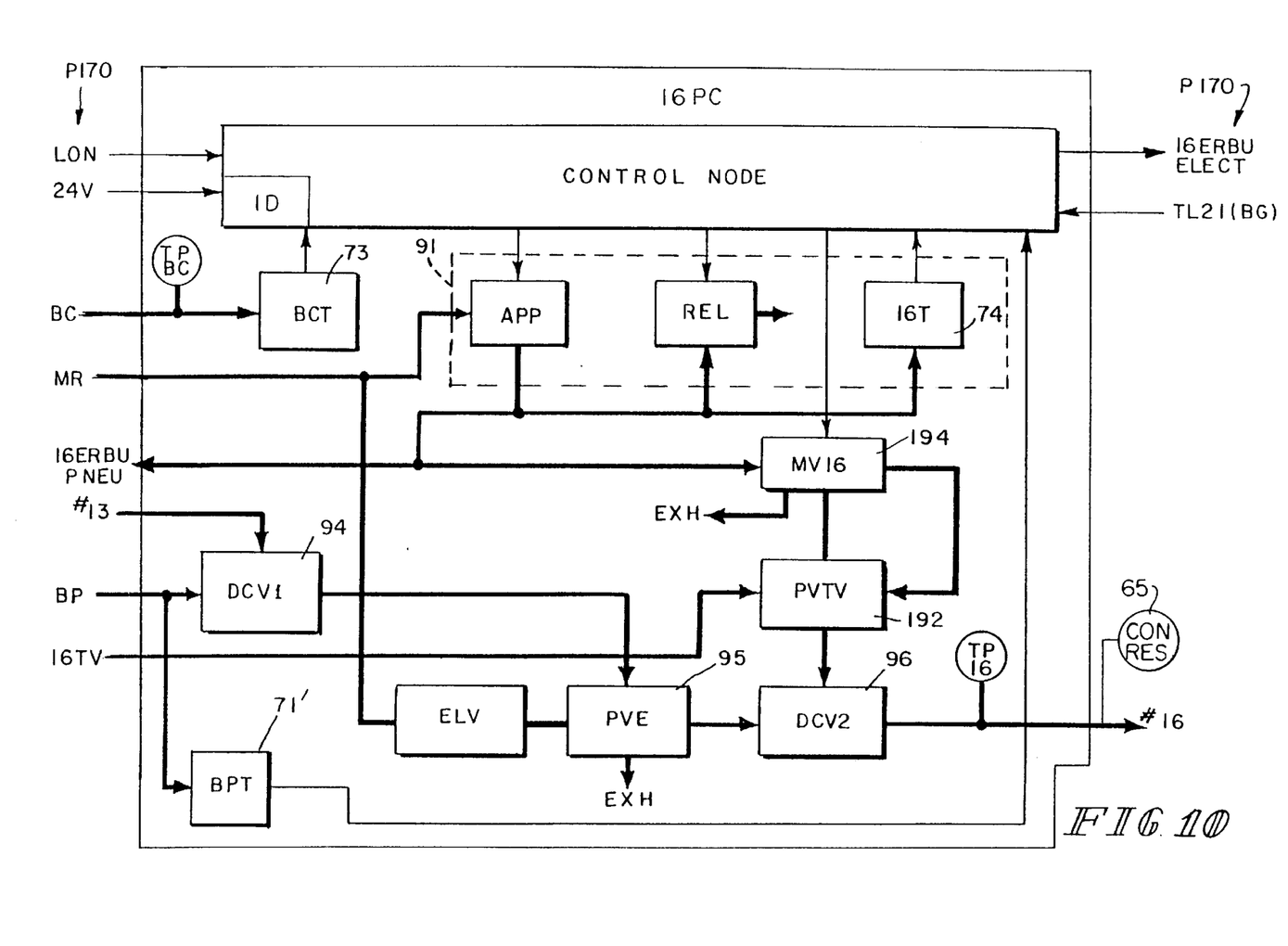
FIG. 10 is a block diagram of the train brake signal or 16 pipe control portion.
Figure 11:
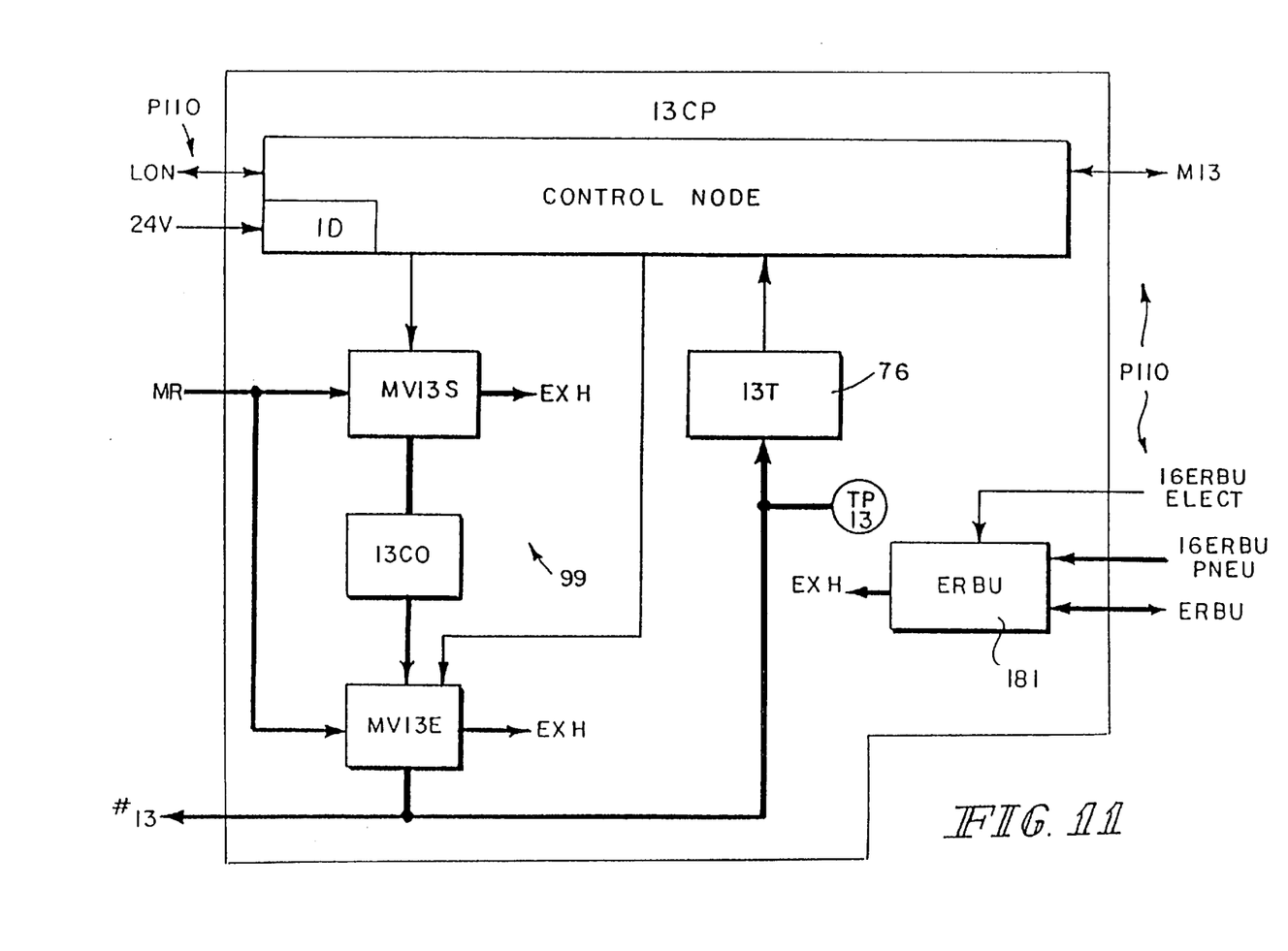
FIG. 11 is a block diagram of the actuating or 13 pipe control portion.

The 16 pipe control portions 16CP or brake signal portion includes a control node connected to the LON works and receives the 24 volt power as shown in FIG. 10. The dynamic brake begin signal TL21 is also provided to the control node to provide a pneumatic brake and release signal using valves AW4. The brake cylinder is monitored by brake cylinder transducer 73 and also includes a brake cylinder test point TPBC. The main reservoir MR is connected to the control reservoir pressure controller 91 which include apply and releases valves under the control of the control node with their output monitored by the 16 pipe transducer 74. The output of the control reservoir pressure controller 91, which is a brake signal, is provided to electromagnetic MV 16 under the control of the control node whose output is connected to a control reservoir select valve PVTV 192. The other input to the control reservoir select valve 192 is a control reservoir back-up signal 16TV from the triple valve.

In normal operations, the select valve 192 selects the output of the control reservoir pressure controller 91 and provides its output to a double check valve 96. The other input of the double check valve 96 is from an emergency valve PVE 95 which receives its control input from a double check 94 which selects the higher of the brake pipe pressure BP or the actuating pipe pressure 13. A regulator valve ELV connects the main reservoir to the emergency valve 95. The output of the double check valve DCV2 is the train brake signal number 16 stored in control reservoir 65.

The electromagnetic valve MV16 controls the select valve PVTV 192 to connect to the double check valve 96 either the signal 16 TV from the triple valve or the output of the electropneumatic valves AW4. If it selects the input from 16 TV, it is connected to exhaust and therefore exhausts the control reservoir 65. If it selects the output of the electromagnetic valve AW4, it is controlled to activate the release valve which again, will connect the control reservoir 65 to exhaust. It should also be noted that the bailoff signal 13 BO is provided as a high signal to the double check valve DCV1 which provides the input to the emergency valve PVE 95 to provide an exhaust input to the double check valve DCV2. Thus, during dynamic braking, an emergency condition in the train brake pipe will not activate the locomotive brakes.

The 16 control portion also includes a second brake pipe transducer 71'. The output of the control reservoir pressure controller 91 is provided as a pneumatic signal 16 ERBU to an equalization reservoir back-up electropneumatic valve ERBU 181 which is controlled by the electrical signal 16 ERBU SELECT from the control node of the 16 control portion at connector P170. The equalization reservoir back-up valve 181, as illustrated in FIG. 12, is located in the 13 control portion, transmits the 16 ERBU signal under the control of the electric 16 ERBU SELECT signal as the equalization reservoir back-up signal ERBU to the equalization reservoir select valve in the equalization reservoir control portion ERCP.

The 13 control or actuating pipe control portion 13CP as illustrated in FIG. 12 includes a control node receiving the LON Network and a 24 volt power line. It also receives an electrical input signal MV 13 which is an electrical bailoff signal from the electric brake valve EBV the power supply and junction box of PSJB. The control module 13CP controls the 13 pipe by an actuating pressure controller 99 which includes an electropneumatic supply valve MV 13S, a pneumatic cut-off valve 13 CO and an electropneumatic vent valve MV 13E. A 13 transducer 76 is connected to the control node and a pressure test point TP13 is also provided in the 13 control portion.

The prior art system of the CCB I would describe with respect to FIGS. 7–10. As previously discussed, a first magnetic valve would be positioned in the 16 portion of FIG. 10 between the regulator valve ELV and the emergency valve PVE 95. Also, the output of the double check valve 96 in FIG. 10 would be connected directly as an input to the brake cylinder valve BCCP 37 in FIGS. 7–9. The 16 TV signal would be provided as an input to the magnetic valve 194, whose output would be connected directly to the double check valve 96. With respect to FIGS. 7–9, the double check valve DCV11 which compares the input from the 16 portion and the 20 portion, provides the output 16 TV to the 16 portion. For resetting a dynamic brake interlock, it also had a second magnetic valve similar to DB11 in FIG. 8 connected between the 16 input to the double check valve DCV11. Thus, as previously described, the output would be connected back to the 16 portion of the manifold and not directly to the brake control valve BCCP 37. For the non-resetting of the dynamic brake interlock, the relation of the dynamic brake interlock magnetic valve DB12 and the bailoff pneumatic valve, was connected to the auxiliary reservoir and not to the output of the triple valve DBTV.

Thus, it can be seen, by the specific connection of the output of the double check valve DCV11 as a control input to the brake cylinder relay BCCP, the reconfiguration of the bailoff valve BO and its connection to the 16 portion, only a single electromagnetic relay is required for either of the dynamic brake interlocks to provide the appropriate controls and empty the reservoirs as required.

Although the present invention has been described and illustrated in detail, it is to be clearly understood that the same is by way of illustration and example only, and is not to be taken by way of limitation. The brake cylinder control portion BCCP is to be considered only a portion of the brake cylinder module as used in the claims. The brake cylinder module includes the brake cylinder control portion BCCP, 16 control portion 16CP and at least the bailoff valve BO if not all of the dead-in-tow control portion DBTV. The spirit and scope of the present invention are to be limited only by the terms of the appended claims.

What is claimed:

1. A locomotive brake control unit comprising:
   a manifold having at least brake pipe, brake cylinder and supply ports;
   a brake pipe module on said manifold and controlling pressure at said brake pipe port;
   a brake cylinder module mounted on said manifold and controlling pressure at said brake cylinder port to apply and release locomotive brakes in response at least to a train braking signal;
   first port on said control unit for receiving a first dynamic brake interlock module for preventing said brake cylinder module from applying said brakes during dynamic braking in response to said train braking signal and permitting said brake cylinder module to reapply said brakes after said dynamic braking in response to a train braking signal present before, during and after said dynamic braking;
   second port on said control unit for receiving a second dynamic brake interlock module for preventing said brake cylinder module from applying said brakes during dynamic braking in response to said train braking signal and preventing said brake cylinder module from reapplying said brakes after said dynamic braking in response to a train braking signal present before, during and after said dynamic braking; and
   said brake cylinder module controlling pressure at said brake cylinder port during dynamic braking in response to said train braking signal in absence of said dynamic brake interlock modules in either of said first or second ports.

2. A locomotive brake control unit according to claim 1, including an independent brake port; and wherein said brake cylinder module controls pressure at said brake cylinder port also in response to pressure at said independent brake port including during dynamic braking.

3. A locomotive brake control unit according to claim 2 including an independent brake module on said manifold and controlling pressure at said independent brake port.

4. A locomotive brake control unit according to claim 2, including an actuating port on said manifold; and wherein said brake cylinder module over rides said train braking signal to release said brakes in response to pressure at said actuating port.

5. A locomotive brake control unit according to claim 1, wherein said brake cylinder module includes a relay valve having a control input; and said first port is between said train braking signal and said control input.

6. A locomotive brake control unit according to claim 1, including an actuating port on said manifold; and wherein said brake cylinder module over rides said train braking signal to release said brakes in response to pressure at said actuating port.

7. A locomotive brake control unit according to claim 6, including an actuating module on said manifold and controlling pressure at said actuating port.

8. A locomotive brake control unit according to claim 1, including an electropneumatic brake signal module on said manifold and providing a train braking signal to said brake cylinder module except when receiving a dynamic brake interlock signal.

9. A locomotive brake control unit comprising:
   a manifold having at least brake pipe, brake cylinder, actuating and supply ports;
   a brake pipe module on said manifold and controlling pressure at said brake pipe port;
   a brake cylinder module on said manifold and controlling pressure at said brake cylinder port to apply and release locomotive brakes in response at least to a train braking signals;
   a brake signal module on said manifold and providing the train braking signal to said brake cylinder module;
   first and second dynamic brake ports on said modules for receiving electropneumatic resetting and non resetting dynamic brake interlocks respectively which control the train braking signals.

10. A control unit according to claim 9, including a pneumatic dead-in-tow module to said manifold and providing back-up pneumatic brake signals to said brake cylinder module.

11. A control unit according to claim 10, wherein said dead-in-tow module includes said second port for said non resetting dynamic brake interlock which connects said brake signal module and said actuating port.

12. A locomotive brake control unit comprising:
   at least brake pipe, brake cylinder, actuating, independent brake and auxiliary and brake signal reservoir ports;
   a brake relay valve having an output connected to the brake cylinder port and having a control input;
   a first select valve having a pair of inputs connected respectively to the independent brake port and a train brake signal and having an output which is the larger of the two inputs and is connected to the control input of the brake relay valve;
   a triple valve connected to and responsive to the reservoir and brake pipe ports to interconnect the auxiliary reservoir and the brake pipe ports and provide a back-up brake signal;
   a bail-off valve selectively connecting the backup brake signal or exhaust to its output in response to signals from the actuating port on its control input;
   a back-up brake signal reservoir port connected to the output of the bail-off valve;
   an electropneumatic valve providing an EP brake signal;
   a second select valve having a pair of inputs receiving the output of the bail-off valve and EP brake signal and selecting one of the inputs as an output which is the train brake signal connected to the first select valve; and
   a train brake signal reservoir port connected to the output of the second select valve.

13. A control unit according to claim 12, including an electropneumatic dynamic brake interlock valve connected between the train brake signal and the first select valve.

14. A locomotive brake control unit comprising:
   a manifold having at least brake pipe, brake cylinder, independent brake and supply ports;
   a brake pipe module on said manifold and controlling pressure at said brake pipe port;
   a brake cylinder module on said manifold and controlling pressure at said brake cylinder port to apply and release locomotive brakes in response at least to a train braking signal and to pressure at said independent brake port including during dynamic braking;
   a relay valve having a control input and a select valve selecting the higher pressure of said train braking signal and independent brake port pressure as said control input to said relay valve on said brake cylinder module;
   a first port on said control unit for receiving a first dynamic brake interlock module for preventing said brake cylinder module from applying said brakes during dynamic braking in response to said train braking signal and permitting said brake cylinder module to reapply said brakes after said dynamic braking in response to a train braking signal present before, during and after said dynamic braking;
   a second port on said control unit for receiving a second dynamic brake interlock module for preventing said brake cylinder module from applying said brakes during dynamic braking in response to said train braking signal and preventing said brake cylinder module from reapplying said brakes after said dynamic braking in response to a train braking signal present before, during and after said dynamic braking; and
   said brake cylinder module controlling pressure at said brake cylinder port during dynamic braking in response to said train braking signal in absence of said dynamic brake interlock modules in either of said first or second ports.

15. A locomotive brake control unit according to claim 14, wherein said first port is on said brake cylinder module between said train braking signal and said select valve.

16. A locomotive brake control unit comprising:
   a manifold having at least brake pipe, brake cylinder, actuating port and supply ports;
   a brake pipe module on said manifold and controlling pressure at said brake pipe port;
   a control reservoir connected to said manifold and whose pressure is a train braking signal;
   a brake cylinder module on said manifold and controlling pressure at said brake cylinder port to apply and release locomotive brakes in response at least to said train braking signal and over riding said train braking signal to release said brakes in response to pressure at said actuating port;
   an interlock port connected to said supply port for receiving a dynamic brake interlock module on said control unit for preventing said brake cylinder module from applying said brakes during dynamic braking in response to said train braking signal and preventing said brake cylinder module from reapplying said brakes after said dynamic braking in response to a train braking signal present before, during and after said dynamic braking;

a bail-off valve responsive to a signal on its control input for connecting said control reservoir to exhaust;

a select valve for selecting the higher pressure of said actuating port pressure and pressure from said dynamic brake interlock module in said interlock port as said control input to said bail-off valve; and said brake cylinder module controlling pressure at said brake cylinder port during dynamic braking in response to said train braking signal in absence of said dynamic brake interlock module in port.

17. A locomotive brake control unit comprising:

a manifold having at least brake pipe, brake cylinder, actuating and supply ports;

a brake pipe module on said manifold and controlling pressure at said brake pipe port;

a brake cylinder module on said manifold and controlling pressure at said brake cylinder port to apply and release locomotive brakes in response at least to a train braking signals;

a brake signal module on said manifold and providing the train braking signal to said brake cylinder module;

first and second dynamic brake ports on said modules for receiving electropneumatic resetting and non resetting dynamic brake interlocks respectively which control the train braking signals;

a pneumatic relay valve on said brake cylinder module and responsive to control pressure to control said brake cylinder port; and said first port being on said brake cylinder module for said resetting dynamic brake interlock which connects said brake signal module as control pressure to said relay valve.

18. A locomotive brake control unit comprising:

at least brake pipe, brake cylinder, actuating, independent brake and auxiliary and brake signal reservoir ports;

a brake relay valve having an output connected to the brake cylinder port and having a control input;

a first select valve having a pair of inputs connected respectively to the independent brake port and a train brake signal and having an output which is the larger of the two inputs and is connected to the control input of the brake relay valve;

a triple valve connected to and responsive to the reservoir and brake pipe ports to interconnect the auxiliary reservoir and the brake pipe ports and provide a back-up brake signal;

a bail-off valve selectively connecting the back-up brake signal or exhaust to its output in response to signals from the actuating port on its control input;

a back-up brake signal reservoir port connected to the output of the bail-off valve;

an electropneumatic valve providing an EP brake signal;

a second select valve having a pair of inputs receiving the output of the bail-off valve and EP brake signal and selecting one of the inputs as an output which is the train brake signal connected to the first select valve;

a train brake signal reservoir port connected to the output of the second select valve;

a third select valve having a pair of inputs connected respectively to the actuating port and a dynamic interlock signal and having an output which is the larger of the two inputs and is connected to the control input of the ball-off valve; and an electropneumatic dynamic brake interlock valve connected to and providing the dynamic interlock signal to the third select valve between the automatic brake signal and the first select valve.

* * * * *

UNITED STATES PATENT AND TRADEMARK OFFICE
CERTIFICATE OF CORRECTION

PATENT NO.   : 6,035,250
DATED        : March 7, 2000
INVENTOR(S)  : Ronald O. Newton and Kevin B. Root It is certified that error appears in the above-identified patent and that said Letters Patent is hereby corrected as shown below:

<u>Column 10, claim 1,</u>
Line 6, delete "mounted".

Signed and Sealed this

Fifth Day of February, 2002

Attest:

JAMES E. ROGAN
*Attesting Officer*   *Director of the United States Patent and Trademark Office*